United States Patent [19]
Tongue

[11] 3,868,604
[45] Feb. 25, 1975

[54] CONSTANT RESISTANCE ADJUSTABLE SLOPE EQUALIZER

[75] Inventor: Ben H. Tongue, West Orange, N.J.

[73] Assignee: Blonder-Tongue Laboratories, Inc., Old Bridge, N.J.

[22] Filed: Apr. 8, 1974

[21] Appl. No.: 458,498

[52] U.S. Cl. .............................. 333/28 R, 333/81 R
[51] Int. Cl. .............................................. H03h 7/14
[58] Field of Search ......................... 333/28 R, 81 R

[56] References Cited

UNITED STATES PATENTS 3,231,837 1/1966 O'Meara ....................... 333/28 R X
3,794,936 2/1974 Poschenrieder et al. ......... 333/28 R

*Primary Examiner*—Paul L. Gensler
*Attorney, Agent, or Firm*—Rines and Rines; Shapiro and Shapiro

[57] ABSTRACT

This disclosure is concerned with a novel constant resistance adjustable attenuation versus frequency slope equalizer using a resonant in-phase path and a dual impedance resonant network out-of-phase path intermediately containing a constant resistance attenuator.

6 Claims, 6 Drawing Figures

CONSTANT RESISTANCE ADJUSTABLE SLOPE EQUALIZER

The present invention relates to constant resistance adjustable slope equalizing networks and the like, being particularly adapted for equalizing attenuation-versus-frequency characteristics of coaxial cable systems and the like, as in CATV and related systems.

The art is replete with numerous types of attenuator slope equalizer networks and the like, useful for a myriad of purposes. The present applicant's prior U.S. letters Pat. No. 2,733,413, for example, discloses a constant resistance network (i.e., one that appears as a constant resistance irrespective of frequency), using fixed network components for the establishment of a fixed transmission characteristic response curve. If the elements of such a fixed network were to be tuned, however, the driving point impedance would change and mismatches would be produced--such designs being not adaptable for freely adjustable use. Other types of adjustable equalizer networks have, however, been proposed such as, for example, that disclosed in U.S. letters Pat. No. 3,496,495, wherein potentiometers or adjustable transformers or the like constituting part of the network elements, enable tuning; but such circuits inherently cannot produce a constant resistance irrespective of frequency. Other approaches in this art have been to produce all-pass transformer-coupled networks such as those used in tweeter and woofer cross-over networks and the like, which can indeed have a composite constant amplitude response, though not substantially adjustable; of, if adjusted, will not provide a constant resistance, as above described. The system of U.S. letters Pat. No. 3,231,837 is typical of this type of approach.

Other approaches to providing constant resistance equalization are, for example, networks involving fixed elements as in U.S. Pat. No. 1,606,817; or similar types of series and parallel dual-reciprocal networks, the product of the reactors of which are substantially constant, as disclosed in U.S. letters Pat. Nos. 2,694,184, 2,238,023 and 2,304,545. If such reciprocal networks are provided with variable constant resistance paths and the like, connected appropriately to both of the networks and ganged so as to track any adjustments thereof, it is possible to obtain variable constant resistance equalization. At high frequencies, however, the distributed capacitance of the paths introduces errors. This approach, moreover, is further disadvantageous in that it requires ganged tracking operation of the paths and the like, which is difficult and costly.

Accordingly, it is an object of the present invention to provide a new and improved constant resistance equalizer with variable or adjustable slope that shall not be subject to the above-described disadvantages, but that, to the contrary, is void of the necessity for separate paths with different network circuit elements that must be ganged to track, and faciley provides both for no attenuation in one position of adjustment, such that all frequencies are passed, and in another mode, enables a variable attenuation versus frequency characteristic, but with the attainment of constant resistance irrespective of the frequency.

A further object is to provide a novel constant resistance adjustable attenuation versus frequency slope equalizer of more general utility, as well.

Other and further objects will be explained hereinafter and are more particularly delineated in the appended claims. In summary, from one of its viewpoints, the invention embraces a constant resistance adjustable attenuation versus frequency slope equalizer having, in combination, input and output terminals having in-phase and out-of-phase paths therebetween, a resonant network connected in the in-phase path, a dual impedance resonant network divided into a pair of equal halves separated by a constant resistance attenuator connected therebetween and in the out-of-phase path, and means for varying the constant resistance attenuator to vary its loss, the equalizer thereby producing varying attenuation versus frequency slopes with constant over-all network terminal driving point resistance. Preferred details are hereinafter set forth.

The invention will now be described in connection with accompanying drawings,

FIG. 1 of which is a schematic circuit diagram illustrating the invention in preferred form, with stray reactance elements and other refinement details omitted in order not to confuse the disclosure and clearly to delineate the basic elements underlying the invention;

Figure 1:
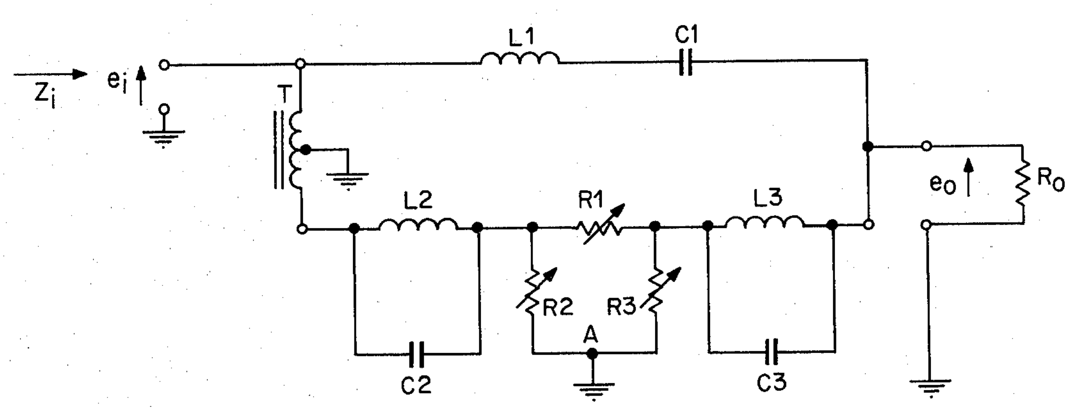
FIGS. 1A, 3 and 4 are similar diagrams of modifications.

In FIG. 1, an autotransformer T is shown receiving the input voltage $e_i$ between its upper terminal and ground, the center tap of the transformer also being grounded. The input $e_i$ is fed to the output $e_o$ through a series tuned circuit comprising inductance L1 and capacitance C1 and through two substantially identical parallel tuned circuits L2-C2 and L3-C3, interconnected by a constant resistance attenuator network A of the pi-type, having variable resistors R1, R2 and R3, connected to be adjusted together and with the lower terminal grounded. An output load $R_o$ of constant resistance is shown connected between the output terminals at $e_o$, the lower terminal of which is also grounded. As before stated, parasitic compensation devices and the like, such as those disclosed, for example, in applicant's prior U.S. letters Pat. No. 2,733,413 may be used, though they are not illustrated in order not to confuse the disclosure.

Figure 1A:
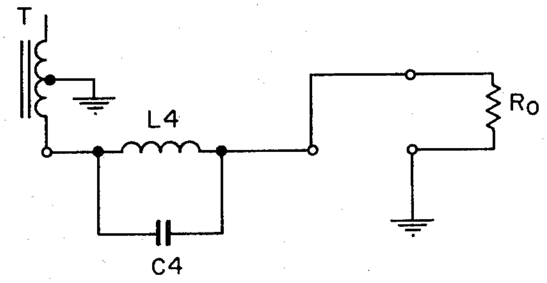

In the circuit of FIG. 1A, the attenuator A of FIG. 1 has been adjusted such that its attenuation is zero. This result is obtained when $R_1$ is zero and $R_2$ and $R_3$ are oppositely infinite. The parallel tuned circuits L2-C2 and L3-C3 may then be considered as equivalent to a single parallel tuned circuit L4-C4 of the same tuning frequency as the individual circuits L2-C2 and L3-C3, with the specific elemental value of C4 being one-half the value of C2(=C3), and the value of L4 being two times the value of L2(=L3). In this circuit, the resonant frequency of L4-C4 will be identical to that of L1-C1, such that $Z_{L4\text{-}C4}$ times $Z_{L1\text{-}C1}$ equals 22,500 squared ohms; and the constant resistance of the attenuator network A, set at zero attenuation, equalling 75 ohms. The output load resistance $R_o$ in this case would be 75 ohms, and the input impedance Zi would also be 75 ohms.

This is an all-pass phase equalizer having theoretically no loss between zero and infinite frequency for an ideal transformer T1, and a peak of time delay at the resonant frequency $f_o$. The operation of the circuit may be easily visualized by considering that at resonant frequency, the input signal $e_i$ is connected from the input to the output through a series resonance circuit L1-C1

(in-phase path), while L4-C4 is an open circuit, all the transmission passing through C1-L1, and thus with no loss.

Still considering the resonant frequency $f_o$, if the attenuator A is now adjusted to any amount of attenuation, such as even an infinite attenuation where R1 (in series) becomes infinite, and R2 and R3 (in parallel and oppositely varied) become approximately 75 ohms each, there is still no loss between input and output because L1-C1 in series resonance presents a short-circuit, while the tuned circuits L2-C2 and L3-C3 are anti-resonant, isolating the R2 and R3 resistors from the input and output terminals, respectively, so they can cause no loss.

Considering again the case where the attenuator A has zero attenuation, if one varies the frequency off resonance, above or below $f_o$, the L1-C1 network will have a particular net reactance and the equivalent L4-C4 network will have a dual reactance. The combined transmission through the in-phase and out-of-phase paths will always result in currents that add up in the output $e_o$, producing no power loss between input and output, but an output phase which is different than the input phase.

Figure 2:
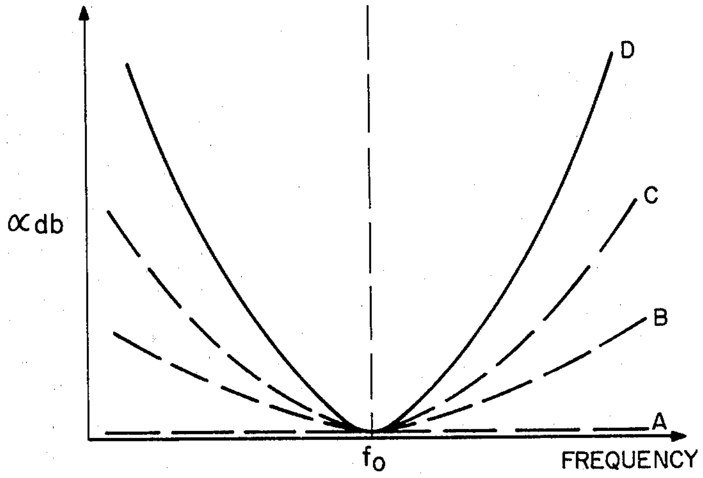
FIGS. 2 and 5 are graphs of the performance of the systems of FIGS. 1 and 4, respectively.

The condition of attenuator A set to zero loss is illustrated by the lower horizontal curve A of FIG. 2, where the attenuation in db is plotted vertically against a frequency abscissa. If there is some attenuation (such as 6 db) set in attenuator A, however, there will still be no transmission loss at $f_o$ because all the input signal goes to the output through the in-phase path; and whatever resistance there may be in the attenuator A is isolated from input and output terminals by the L2-C2 and L3-C3 tuned circuits. Off resonance, however, say below $f_o$, for instance, less signal can transfer between the input and output through the out-of-phase path because of the loss in the attenuator A. The output and input impedances will be inductive because the L3-C3 combination and the L2-C2 combination are net inductive. The transmission through the in-phase L1-C1 path being of a net capacitive impedance, there will be somewhat of a reduction of the loss, adding a capacitive component to the input and output impedances that exactly cancels the inductive impedance and making the network of constant resistance $R_o$, looking at the input terminals $Z_i$. However, there will be some loss caused by the attenuator network A, as shown in curve B of FIG. 2; curves C and D representing higher attenuator loss settings. If the loss of attenuator A becomes infinite, curve D results, which is identical to that of the two terminal driving point impedance of the series resonance circuit. The signal passes from input to output through the in-phase path L1-C1, and the L2-C2 and L3-C3 impedances act with the R2 and R3 resistances at 150 ohms to provide inductive impedance compensation to maintain the constant resistance characteristic of the network, even down to zero frequency.

Figure 3:
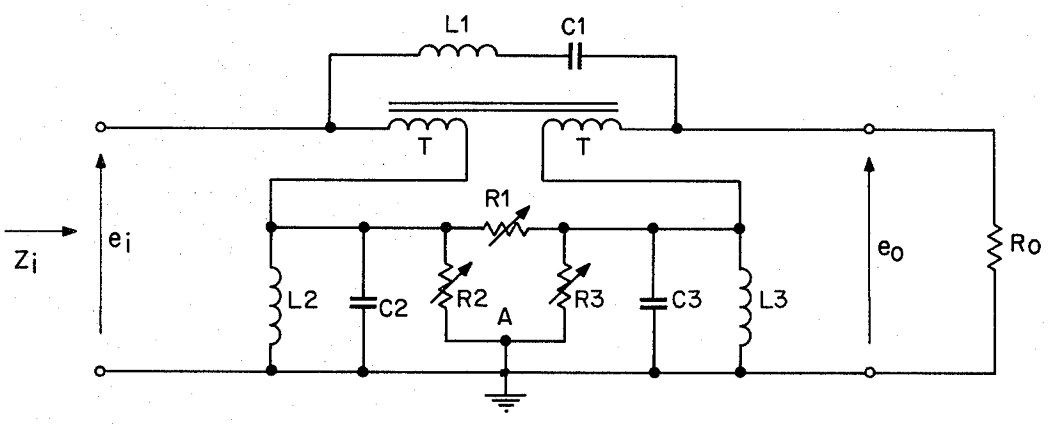

In the circuit of FIG. 1, moreover, the input $e_i$ is effectively shown applied to the ports represented by the upper terminal of the transformer T and its grounded center tap. The output is shown taken from the common connection between C1 and L3-C3 through the terminating resistor $R_o$ and ground. Complementary input and output ports may also be employed, however, as shown in FIG. 3, wherein the auto-transformer T is illustrated in two parts, with its tap separated into two windings. The input voltage $e_i$ is shown applied to the ports represented by the left-hand terminal of the left-hand winding of transformer T and ground, with the output terminal connected from the right-hand terminal of the right-hand winding through the terminating resistor $R_o$ and ground. One advantage of the utilization of FIG. 3 over the circuit of FIG. 1 resides in the fact that stray capacitances-to-ground of the attenuator A may be absorbed in the capacitances of the parallel tuned circuits; whereas in the embodiment of FIG. 1, the reactances have no values connected from the hot connection of the attenuator to ground.

The before-discussed prior approaches to the solution of the problem of the invention with multiple paths associated with the dual impedance networks and the ganging requirement, gave a certain measure of asymetry in the shape of the characteristic curve, as shown, for example, in U.S. letters Pat. No. 2,694,184. Such devices, moreover, required the copious ganging of entirely different types of elements associated with the dual circuits, adding greatly to the complexity and difficulty of construction and operation. Still, it did not seem possible prior to the present invention to be able to have a single resistive attenuator with a common ground, and associated with one of the network circuits alone, to attain these results. This lack of obviousness may have resided in the unconventional approach of employing an all-pass network in the first instance and making an adjustable slope attenuator from it, and the first-blush reaction that any resistive element introduced into a totally reactive all-pass network must cause impedance mismatch. It was thus surprising that the particular type of configuration underlying the present invention did, indeed, produce these results and with substantially perfect symmetry of frequency characteristic, and void of the necessity of ganging paths and the like associated with dual circuits, all as distinguished from the simple single path hereindescribed.

Figure 4:
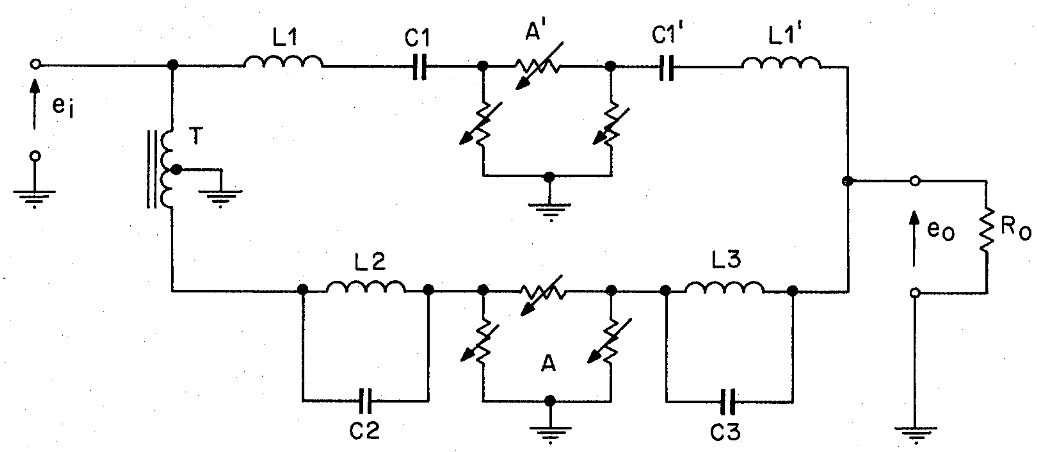
Figure 5:
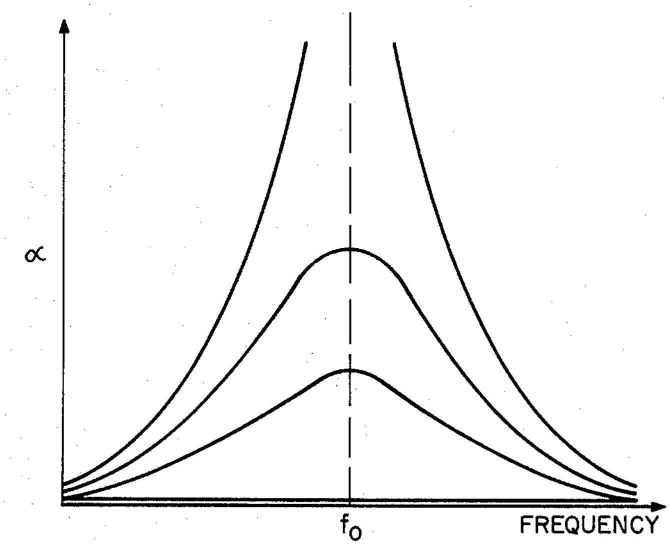

The invention, of course, may be used with either frequencies below or higher than $f_o$, or both, as desired. Two series resonant networks, for example, may be applied in the in-phase path, with a similar variable constant resistance attenuator network A' connected therebetween at the junction point between the two series networks L1-C1 and L1'-C1' and ground, as shown in FIG. 4. Such a circuit can provide further flexibility for the slope of the attenuation-versus-frequency characteristic curve. While the example of FIG. 4 is directed to the type of circuit shown in FIG. 1, it may be equally well applied in connection with the embodiment of FIG. 3. The variable slope characteristic produced by the network A' would have the complementary peaked type of attenuation versus frequency characteristic shown in FIG. 5. If the two variable resistance attenuators A and A' are both used, as in FIG. 4, obviously a composite of the two effects can be produced for a wide variety of slope characteristics.

In a practical case of a CATV distribution amplifier for the frequency range of 50 to 300 MHz, the inductances L1 and C1 may be caused to resonate at about 300 MHz, with C1 being about 4.7 picofarads. The tuned circuits L2-C2, L3-C3 are tuned to the same frequency. With the attenuator adjusted for zero attenuation, a frequency response of flat ±0.5 db was obtained. With the pi-type attenuator tuned for a maximum attenuation of value of 16 decibels, a frequency response was produced having a slope of 16 db.

About 1 db loss occurred at 300 MHz and C17 db loss at 54 MHz. The shape of the slope closely approximated an inverse square root slope (slope of a piece of coax cable of length sufficient to give a loss difference between 54 and 300 MHz of 17 db).

It is to be understood that in connection with practical applications, such as the equalization of cable as in CATV and related systems, supplemental resistive-capacitive arms may be connected in parallel with the series resonant tuned circuit and in series with the dual parallel resonant tuned circuits, in which event an inductive-resistive circuit would be used that modifies the shape for more accurate compensation of the transmission line characteristics. These added correcting networks, however, may be employed in such a fashion that the impedance of the series path is still the dual of the out-of-phase path, as before described.

Further modifications will also occur to those skilled in this art and all such are considered to fall within the spirit and scope of the invention as defined in the appended claims.

What is claimed is:

1. A constant resistance adjustable attenuation versus frequency slope equalizer having, in combination, input and output terminals have in-phase and out-of-phase paths therebetween, a resonant network connected in the in-phase path, a dual resonant network divided into a pair of equal halves separated by a constant resistance attenuator connected therebetween and in the out-of-phase path, and means for varying the constant resistance attenuator to vary its loss, the equalizer thereby producing varying attenuation versus frequency slopes with constant over-all network terminal driving point resistance.

2. A constant resistance adjustable attenuation versus frequency slope equalizer as claimed in claim 1 and in which autotransformer means is connected between the in-phase and out-of-phase paths at the input terminals.

3. A constant resistance adjustable attenuation versus frequency slope equalizer as claimed in claim 2 and in which said autotransformer means is provided with a grounded intermediate tap, said constant resistance attenuator is grounded, and said output terminals are terminated in a grounded characteristic impedance resistive load.

4. A constant resistance adjustable attenuation versus frequency slope equalizer as claimed in claim 2 and in which said autotransformer means is provided with two unconnected windings, said constant resistance attenuator is grounded, and said output terminals are terminated in a grounded characteristic impedance resistive load.

5. A constant resistance adjustable attenuation versus frequency slope equalizer as claimed in claim 1 and in which said resonant network is a series resonant circuit and said dual resonant network comprises a pair of equal parallel resonant networks.

6. A constant resistance adjustable attenuation versus frequency slope equalizer as claimed in claim 1 and in which said constant resistance attenuator is of the pi-type wherein the series arm varies oppositely with the parallel arms.

* * * * *